United States Patent
Kumar et al.

(10) Patent No.: US 11,500,123 B2
(45) Date of Patent: Nov. 15, 2022

(54) HYBRID 3D GEOCELLULAR REPRESENTATION OF SELECTED NATURAL FRACTURE NETWORK SUBSETS

(71) Applicant: Landmark Graphics Corporation, Houston, TX (US)

(72) Inventors: Amit Kumar, Houston, TX (US); Michael Loyd Brewer, Katy, TX (US); Dominic Camilleri, Houston, TX (US); Steven Ward, Austin, TX (US)

(73) Assignee: Landmark Graphics Corporation, Houston, TX (US)

( * ) Notice: Subject to any disclaimer, the term of this patent is extended or adjusted under 35 U.S.C. 154(b) by 507 days.

(21) Appl. No.: 15/781,262

(22) PCT Filed: Feb. 29, 2016

(86) PCT No.: PCT/US2016/020107
§ 371 (c)(1),
(2) Date: Jun. 4, 2018

(87) PCT Pub. No.: WO2017/151100
PCT Pub. Date: Sep. 8, 2017

(65) Prior Publication Data
US 2020/0309990 A1    Oct. 1, 2020

(51) Int. Cl.
*G01V 99/00* (2009.01)
*E21B 47/00* (2012.01)
(Continued)

(52) U.S. Cl.
CPC ............ *G01V 99/005* (2013.01); *E21B 47/00* (2013.01); *E21B 47/006* (2020.05); *E21B 49/00* (2013.01); *G01V 1/48* (2013.01); *G06T 17/05* (2013.01)

(58) Field of Classification Search
CPC ........ G01V 99/005; G01V 1/48; E21B 47/00; E21B 49/00; E21B 47/006; G06T 17/05
(Continued)

(56) References Cited

U.S. PATENT DOCUMENTS

| 7,634,395 B2 * | 12/2009 | Flandrin | G06T 17/20 703/2 |
| 2010/0138196 A1 * | 6/2010 | Hui | E21B 43/00 703/1 |

(Continued)

FOREIGN PATENT DOCUMENTS

| WO | WO 2009/139949 A1 | 11/2009 |
| WO | WO 2012/096911 A2 | 7/2012 |
| WO | WO 2016/007169 A1 | 1/2016 |

OTHER PUBLICATIONS

Lei, Qinghua, et al. "A new approach to upscaling fracture network models while preserving geostatistical and geomechanical characteristics." Journal of Geophysical Research: Solid Earth 120.7 (2015). pp. 4784-4807. (Year: 2015).*

(Continued)

*Primary Examiner* — John E Johansen
(74) *Attorney, Agent, or Firm* — Haynes and Boone, LLP (57) ABSTRACT

Hybrid 3D geocellular grids are generated to represent a subset of a natural fracture network ("NFN") directly in the simulation, while the remainder of the NFN is approximated by a multi-continuum formulation. The resulting output is a 3D geocellular grid that possesses a higher level of mesh resolution in those areas surrounding the first fracture subsets, and lower mesh resolution in the areas of the second fracture subset.

17 Claims, 10 Drawing Sheets

(51) Int. Cl.
*E21B 49/00* (2006.01)
*G01V 1/48* (2006.01)
*G06T 17/05* (2011.01)

(58) Field of Classification Search
USPC .......................................................... 703/10
See application file for complete search history.

(56) References Cited

U.S. PATENT DOCUMENTS

| | | |
|---|---|---|
| 2012/0116740 A1 | 5/2012 | Fourno et al. |
| 2014/0039853 A1* | 2/2014 | Fung .................. E21B 49/00 703/2 |
| 2014/0149098 A1 | 5/2014 | Bowen et al. |
| 2014/0379312 A1 | 12/2014 | Dedontney et al. |

OTHER PUBLICATIONS

Karimi-Fard, Mohammad, Bin Gong, and Luis J. Durlofsky. "Generation of coarse-scale continuum flow models from detailed fracture characterizations." Water resources research 42.10 (2006). pp. 1-13. (Year: 2006).*

Lien, Martha E., et al. "Multiscale regularization of flooding optimization for smart field management." SPE Journal 13.02 (2008). pp. 195-204. (Year: 2008).*

Dershowitz et al., "Advances in Discrete Fracture Network Modeling", Golder Associates Inc, Jan. 2004.

Dershowitz et al., SPE 62498, SPE-REE Apr. 2000; "Integration of Discrete Feature Network Methods With Conventional Simulator Approaches".

Elfeel et al., SPE 154369, EAGE 2012, "Static and Dynamic Assessment of DFN Permeability Upscaling".

Harstad et al., Sandia Report SAN96-1955, UC-132 "Characterization and Fluid Flow Simulation of Naturally Fractured Frontier Sandstone, Green River Basin, Wyoming".

International Search Report and The Written Opinion of the International Search Authority, or the Declaration, dated Nov. 29, 2016, PCT/US2016/020107, 18 pages, ISA/KR.

Oda, M., 1985, Permeability Tensor for Discontinuous Rock Masses, Geotechnique vol. 35, pp. 483.

* cited by examiner

| | Include between | | Attribute | |
|---|---|---|---|---|
| | Min | Max | | |
| AND | 200 | 230 | Azimuth | |
| OR | 1000 | 1500 | Length | |
| AND | 10 | 22 | Porosity | |
| | | | permeability | |
| | | | conductivity | |
| | | | Aperature | |
| | | | Other_user-defined | |
| | Only include | | Set# | |
| | 1,2,5,7 | | | |
| | 3 | | Degree of Separation less than connectivity factor | |

HYBRID 3D GEOCELLULAR REPRESENTATION OF SELECTED NATURAL FRACTURE NETWORK SUBSETS

PRIORITY

The present application is a U.S. National Stage patent application of International Patent Application No. PCT/US2016/020107, filed on Feb. 29, 2016, the benefit of which is claimed and the disclosure of which is incorporated herein by reference in its entirety.

FIELD OF THE DISCLOSURE

The present disclosure relates generally to hydrocarbon reservoir modeling and, more specifically, to a reservoir simulation system which represents a subset of a natural fracture network ("NFN") directly in the simulation, while the remainder of the NFN is approximated by a multi-continuum formulation.

BACKGROUND

In the oil and gas industry, reservoir modeling involves the construction of a computer model of a petroleum reservoir for the purpose of improving estimation of reserves and making decisions regarding the development of the field. For example, geological models may be created to provide a static description of the reservoir prior to production. In contrast, reservoir simulation models may be created to simulate the flow of fluids within the reservoir over its production lifetime. In an integrated workflow, static models, represented by structured or unstructured grids, can also be utilized in reservoir simulation, often serving as an initial point in flow simulation over time.

With reservoir simulation models, the modeling of fractures within a reservoir can present a challenge, requiring a thorough understanding of matrix flow characteristics, fracture network connectivity, and fracture-matrix interaction. Fractures can be described as open cracks or voids within the formation and can either be naturally occurring or artificially generated from a wellbore. Over their geologic history, some natural fractures can also get sealed by deposition within the cracks. The correct modeling of the fractures is important as the properties of fractures such as spatial distribution, aperture, length, height, conductivity, and connectivity significantly affect the flow of reservoir fluids to the well bore.

Natural fractures can have a huge impact on production from a conventional or unconventional reservoir. Since natural fractures can influence the effectiveness of a hydraulic fracture, as well as well productivity and connectivity between wells, simulating those scenarios is very important for asset teams trying to make good decisions in exploration and production of shale reservoirs. Examples of these decisions are reserves estimation, field planning (for primary, secondary, or tertiary recovery), completion optimization, well-spacing optimization, surface facilities optimization, and so on. Often these are complex decisions, requiring both financial and technical considerations. Thus, reservoir simulators have been modeling natural fractures for a very long time (decades). However, the current widespread practice is still to use a dual porosity or more generally a dual continuum approximation to represent all natural fractures in the simulation model. Some simulation products use unstructured grids to mesh-in all natural fractures directly into the simulation grid. However, these grids tend to have an extremely large cell count that can make the simulation too large and taxing for most computer systems.

DESCRIPTION OF ILLUSTRATIVE EMBODIMENTS

Illustrative embodiments and related methodologies of the present disclosure are described below as they might be employed in a reservoir simulator that produces a hybrid 3D geocellular representation of NFNs. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As will be described below, illustrative methods and embodiments of the present disclosure modify a 3D geocellular grid to represent a subset of a NFN directly in the simulation, while the remainder of the NFN is approximated by a multi-continuum formulation. In general, the disclosed embodiments herein provide two alternative methods whereby a user can interactively select which subsets of the NFN will be directly simulated and approximated, to thereby create a hybrid model with both dual continuum modeling and unstructured grid based direct modeling of NFNs. In a first illustrative method, a geocellular grid is first generated having dual continuum properties from a selected fracture subset of a NFN. Another selected fracture subset of the NFN is then directly meshed, or embedded, into the grid. In a second illustrative method, a selected fracture subset of the NFN is directly embedded into the grid, whereby dual-continuum properties are then calculated on the grid. Thus, a user can mesh-in some of the natural fractures for direct use in the simulation, while other fractures can be approximated as dual porosity or dual continuum models. Accordingly, a hybrid approach is made possible whereby the approximations inherent in the dual continuum are balanced against the benefits of directly modeling natural fractures to provide a balanced simulation in a reasonable timeframe, even for large NFNs (e.g., >100,000 fractures). As a result, the simulator has a much improved performance.

The actual generation of the hybrid model is typically not onerous in terms of elapsed time even on a typical engineering workstation (e.g., HP Z800). However, it is possible to run into situations where the grid and/or the size of the NFNs are so large that the computations required to create the hybrid model itself become a bottleneck. The upscaling calculations are the most compute-intensive part of this process, and these calculations can be performed in parallel by distributing the calculations over multiple processes running in parallel on one machine or several machines, in a high-performance computing (HPC) or a cloud environment (with multiple virtual machines). Moreover, upscaling calculations with one cell of the grid is independent of those with another. This makes it practical to generate the hybrid models even for very large problems. Once the hybrid model is created, the simulation itself can be run in a single process or multiple parallel processes, using software available commercially.

In a more generalized description of the alternative methods mentioned above, a fracture network having a plurality of cells therein is generated using reservoir data. NFNs are composed of fractures that can be highly heterogeneous with respect to their spatial location, shape, and physical dimensions and properties. Several software applications, many of them commercial (e.g., DecisionSpace® NFN), can be used to generate discrete representation of these networks. Typically, in these applications, stochastic algorithms are used because of the high degree of uncertainty associated with subsurface fracture characterization. Sometimes, fracture characterization studies performed on surface outcrops are used as analogues from which inputs are provided to the NFN generation software applications. The NFN generation software make it possible to generate and visualize multiple realizations of fracture networks in the same software used to visualize subsurface geological and geophysical (G&G) data typically as part of a shared earth model. Visualization itself is useful for enhancing geological understanding in a naturally fractured reservoir, but a much more impactful use of the generated NFNs is to use them in reservoir simulation models to quantify their effect on fluid flow and hence well productivity in naturally fractured reservoirs.

Once generated, a first fracture subset is selected from the fracture network. Then, a second fracture subset, different from the first fracture subset, is selected from the fracture network. The cells of the 3D geocellular grid near the first fracture subset are refined, and the second fracture subset is upscaled. Thereafter, the first fracture subset and the upscaled second fracture subset are embedded within the 3D geocellular grid, thereby generating a hybrid 3D geocellular grid. Note that the 3D geocellular grids described herein may be generated using structured or unstructured grids. In an alternate method, the first and second fracture subsets are again selected as in the foregoing method. Here, however, a high resolution 3D geocellular grid is generated through refinement or direct creation of the high resolution grid. Thereafter, the first and second fracture subsets are embedded in the 3D geocellular grid. The first fracture subset and the second fracture subset are then upscaled in the 3D geocellular grid.

In the illustrative embodiments described herein, various techniques may be utilized to refine and embed (also referred to as "resolving") the fractures. Refinement, as used herein, refers to the splitting of cells in the 3D space, a process that ultimately results in a 3D geocellular grid of higher mesh resolution. The fracture network is then resolved (or embedded), within the high resolution 3D geocellular grid. Embedded/resolving, as used herein, refers to generating an earth model, using the high-resolution mesh, in which the fractures and near-fracture areas in the model have a higher mesh resolution compared to other areas of the model. Since the mesh will be used for numerical simulation, in general the smaller cells (as a result of the refinement) will result in more accurate solutions when compared to larger cells. Since reservoir simulators generate approximations of mathematical formulas, the smaller the cells, the closer the approximation mimics the mathematical formula.

Upscaling refers to approximating the effect of natural fractures on flow through a grid cell of an input grid by calculating the effective fracture properties, along with those that quantify the matrix-fracture fluid flow. The calculated properties, namely directional fracture permeabilities, fracture porosity, and some measure of the transfer function (such as, for example, shape factor or transmissibility of matrix-fracture exchange of fluid), are applied to the cell of the dual continuum grid that corresponds to the input grid cell in the matrix upon which the upscaling is being performed.

A variety of refinement techniques may be used with embodiments of the present disclosure. One illustrative refinement technique is referred to as Anisotropic Geometry-Adaptive Refinement ("AGAR"). AGAR is one method for embedding fracture networks into an existing 3D geocellular grid, which exists as a structured grid and physical property values. The fracture network is in the form of a surface mesh (manifold or non-manifold) in a three-dimensional ("3D") space. The structured grid is then anisotropically refined to embed the fractures and to provide appropriate cell grading in the near-fracture region. In general, the AGAR technique examines cells to determine those cells which require refinement, refines those cells in the appropriate directions (thus, anisotropic), and then terminates once no cell requires refinement.

Moreover, since AGAR applies an anisotropic approach when manipulating the cells, the data count and its associated computational requirements are greatly reduced. As a result, the disclosed methods are faster and more efficient than conventional methods which apply a brute-force analysis to all cells, thus resulting in more data- and resource-taxing computations. Furthermore, because of the generated 3D geocellular grid's relationship to the original 3D geocellular grid, property interpolation is minimized and the generated 3D geocellular grid respects the original property values well. Accordingly, in addition to the other advantages described herein, embodiments of the present disclosure provide higher mesh resolution modeling while also reducing the computational requirements.

Figure 1:
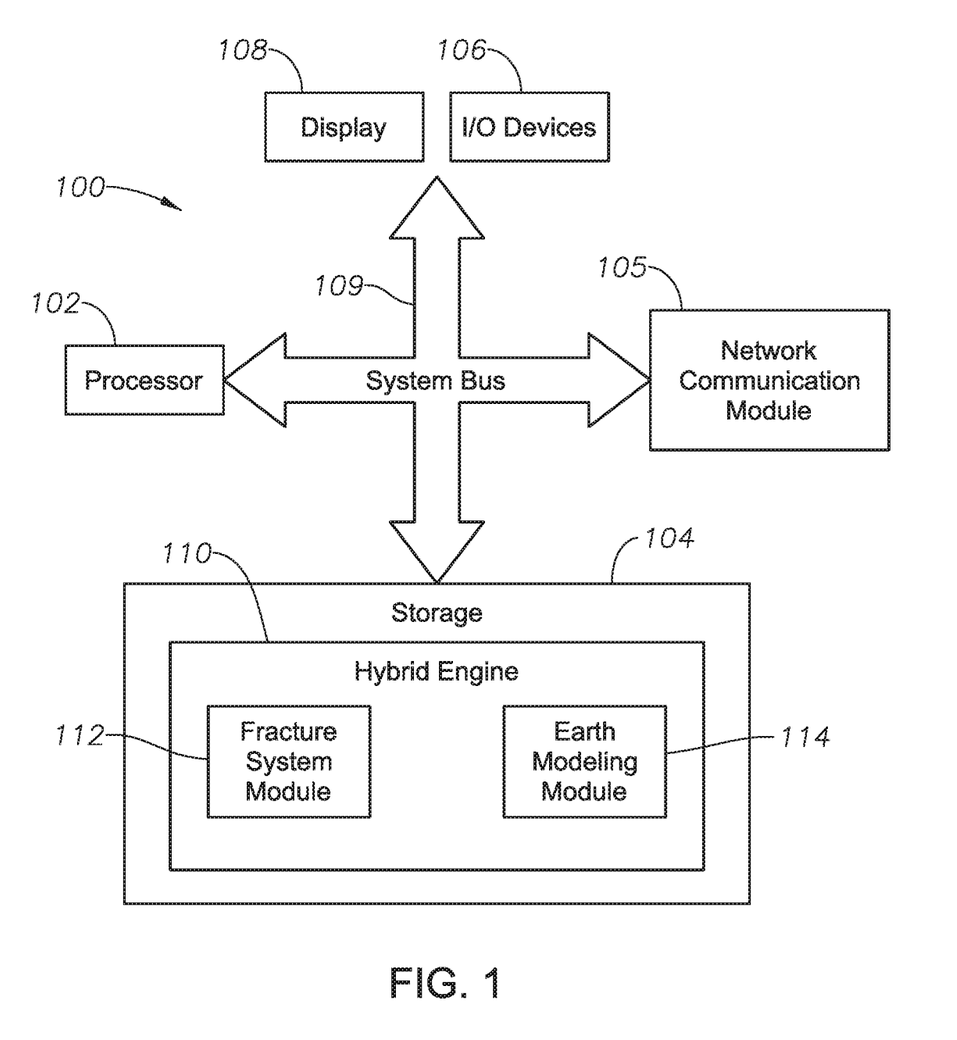
FIG. 1 shows a block diagram of a hybrid simulation system 100 according to certain illustrative embodiments of the present disclosure.

FIG. 1 shows a block diagram of a hybrid simulation system 100 according to certain illustrative embodiments of the present disclosure. Hybrid simulation system 100 includes at least one processor 102, a non-transitory, computer-readable storage 104, transceiver/network communication module 105, optional I/O devices 106, and an optional display 108 (e.g., user interface), all interconnected via a system bus 109. Software instructions executable by the processor 102 for implementing software instructions stored within hybrid engine 110 in accordance with the illustrative embodiments and methods described herein, may be stored in storage 104 or some other computer-readable medium. Although not explicitly shown in FIG. 1, it will be recognized that hybrid simulation system 100 may be connected to one or more public and/or private networks via one or more appropriate network connections. It will also be recognized that the software instructions comprising hybrid engine 110 may also be loaded into storage 104 from appropriate storage media (e.g. a portable memory/hard drive, a CD-ROM, or the like) via wired or wireless methods.

Moreover, those ordinarily skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Still referring to FIG. 1, in certain illustrative embodiments, hybrid engine 110 comprises fracture system module 112 and earth modeling module 114. Fracture system module 112 provides the geometric definition of the fracture network, along with the petrophysical and mechanical property distributions for the fractures, as would be understood by those ordinarily skilled in the art having the benefit of this disclosure. An illustrative fracture system module may be, for example, the Fracpro® or Gohfer® platforms.

Still referring to the illustrative embodiment of FIG. 1, hybrid engine 110 also includes earth modeling module 114 to integrate with the fracture data contained within fracture system module 112 in order to provide subsurface stratigraphic visualization of the fractures and reservoir including, for example, geo science interpretation, petroleum system modeling, geochemical analysis, stratigraphic gridding, facies, net cell volume, and petrophysical property modeling. In addition, earth modeling module 114 models well paths, as well as cross-sectional through the facies and porosity data. Illustrative earth modeling platforms include DecisionSpace®, which is a commercially available software application developed and marketed by Landmark Graphics Corporation of Houston, Tex. However, those ordinarily skilled in the art having the benefit of this disclosure realize a variety of other earth modeling platforms or set of software applications may also be utilized with the present disclosure.

Hybrid simulation engine 110 may also include processing circuitry to enable robust data retrieval and integration of historical and real-time reservoir related data that spans across all aspects of the well planning, construction and completion processes such as, for example, drilling, cementing, wireline logging, well testing and stimulation. Moreover, such data may include, for example, logging data, well trajectories, petrophysical rock property data, mechanical rock property data, surface data, fault data, data from surrounding wells, data inferred from geostatistics, etc. The database (not shown) which stores this information may reside within fracture system module 112 or at a remote location. An illustrative database platform is, for example, the INSITE® software suite, commercially offered through Halliburton Energy Services Inc. of Houston Tex. Those ordinarily skilled in the art having the benefit of this disclosure realize there are a variety of software platforms and associated systems to retrieve, store and integrate the well related data, as described herein.

In addition, hybrid engine 110 may also include multi-domain workflow automation capabilities that may connect any variety of desired technical applications. As such, the output from one application, or module, may become the input for another, thus providing the capability to analyze how various changes impact the well placement and/or fracture design. Those ordinarily skilled in the art having the benefit of this disclosure realize there are a variety of workflow platforms which may be utilized for this purpose.

As generally described above, methods and embodiments of the present disclosure describe algorithms for automatic mesh refinement to resolve/embed features in a reservoir for applications that include, but are not limited to, reservoir simulation and modeling. One important aspect of the present disclosure is the ability to select fracture subsets for direct simulation and upscaling in order to reduce the computational requirements on the processing system.

Figure 2:
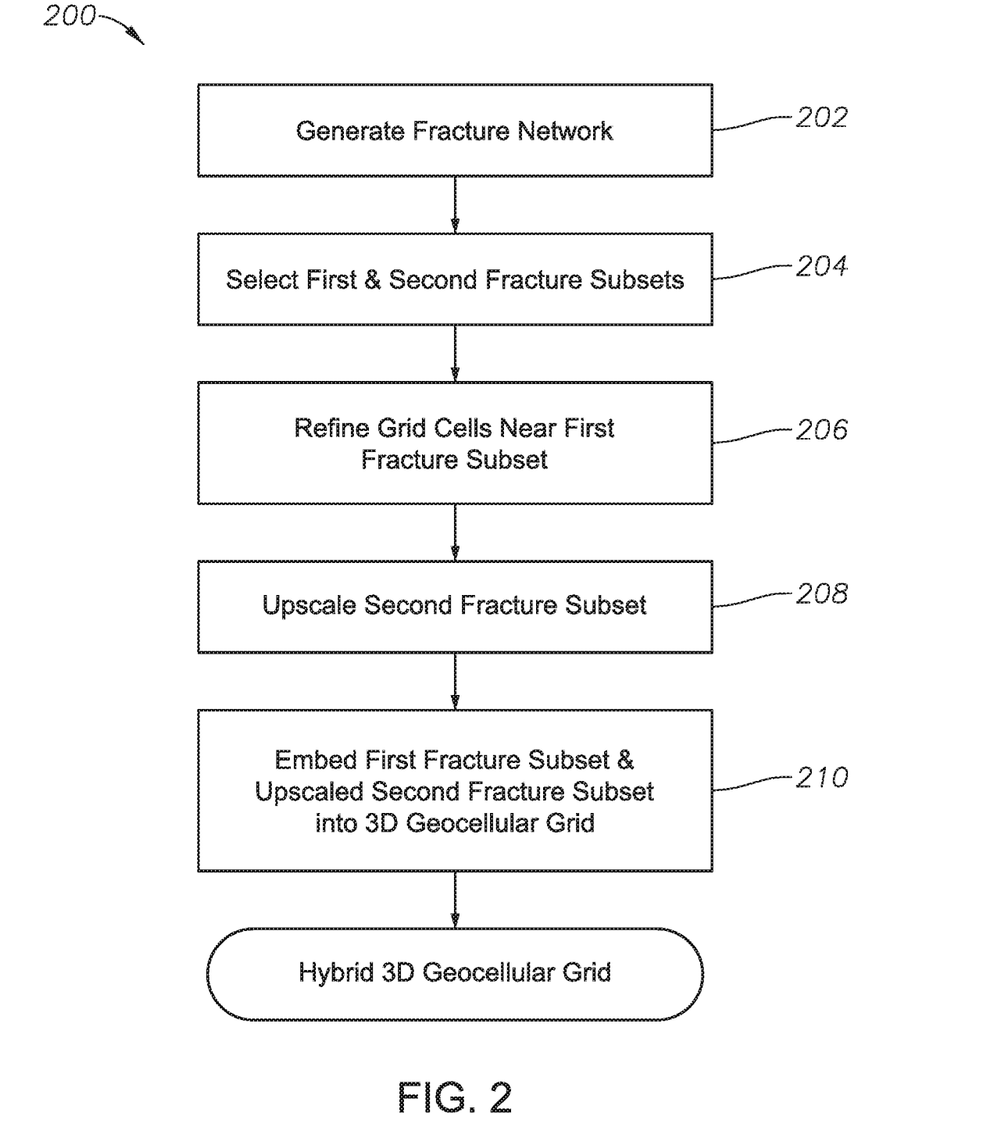
FIG. 2 is a flow chart of a method for generating a hybrid 3D geocellular grid, according to certain illustrative methods of the present disclosure.

FIG. 2 is a flow chart of a method 200 for generating a hybrid 3D geocellular grid, according to certain illustrative methods of the present disclosure. At block 202, hybrid simulation system 100 is initialized in order to generate a reservoir Earth Model (i.e., 3D geocellular grid) having a NFN therein. During initialization, hybrid engine 110 uploads data from fracture system module 112 and Earth Modeling module 114. Such data may include, for example, geocellular grid and fracture data. The geometry for the input fractures may be provided in any number of ways, and may include analytic or discrete surface descriptions. The fracture properties required for any illustrative method are defined by the specific dual continuum property calculation used and the specific reservoir simulation being run, as will be understood by those ordinarily skilled in the art having the benefit of this disclosure.

Figure 3A:
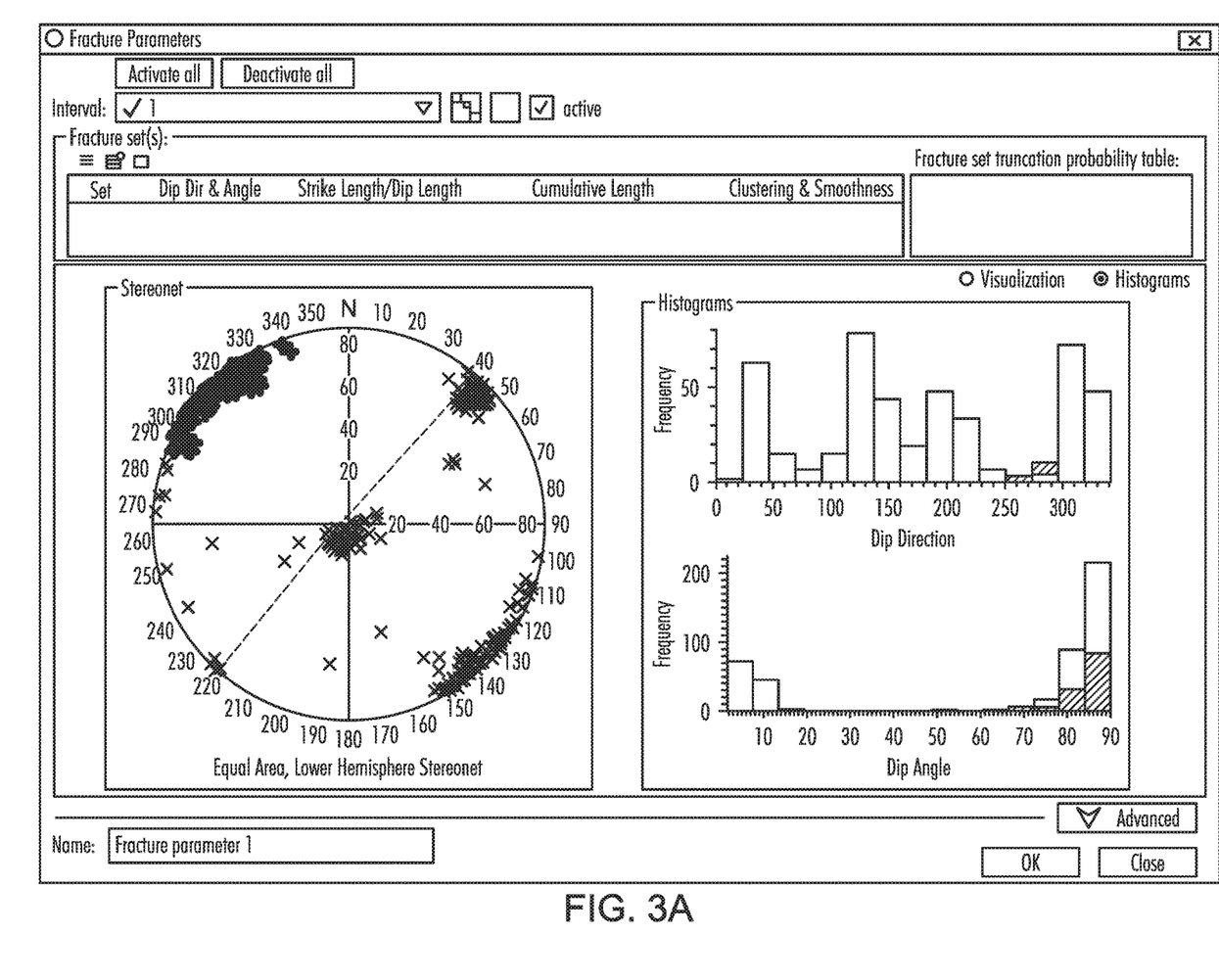
FIG. 3A is a graphical user interface depiction of a stereonet plot for selection of natural fracture subsets, according to certain illustrative embodiments of the present disclosure.

At block 204, hybrid simulation system 100 prompts the user to select fracture subsets in the NFN. Here, the subsets will include a first fracture subset and a second fracture subset different from the first subset. This user-defined filtering may be accomplished in a variety of ways. For example, the selection may be made using a stereonet, fracture attribute or some other suitable visualization. FIG. 3A is a graphical user interface depiction of a stereonet plot for selection of natural fracture subsets, according to certain illustrative embodiments of the present disclosure. As shown in FIG. 3A, a user may select a fracture set interactively. The user can use a graphical input device, such as a mouse or stylus, to select a contiguous area of the stereonet diagram or select one or more bars next to each other in the histogram chart. The user can then repeat such actions with a modified action, such that he/she can create a collection of all the areas selected by adding to or removing areas or bars from the collection. Once created, the whole collection represents the user-selected fracture sets, i.e. all fractures that are represented in the selected area of the stereonet or in the selected bars of the histogram comprise the set of fractures selected by the user, out of all existing fractures in the NFNs under consideration, for further action.

Figure 3B:
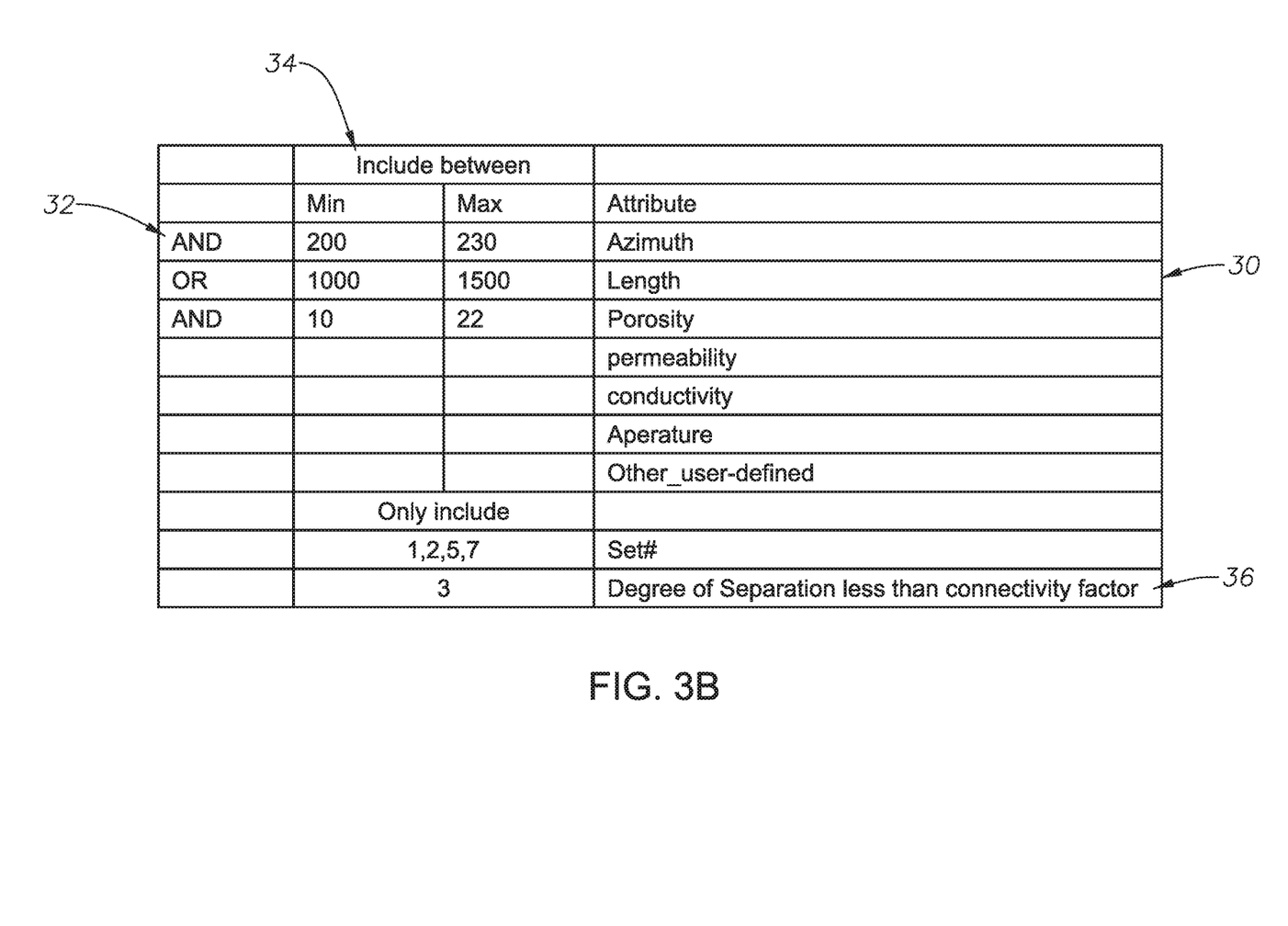
FIG. 3B illustrates an alternative filtering scheme to select a fracture subset, according to yet another illustrate embodiment of the present disclosure.

FIG. 3B illustrates an alternative filtering scheme to select a fracture subset, according to yet another illustrate embodiment of the present disclosure. In this example, a user may select the fracture subsets to directly model using a variety of fracture attributes 30 including, for example, azimuth, length, porosity, permeability, conductivity, aperture or other user-defined attributes. Boolean operations 32 may also be used to define the attributes as desired, along with ranges 34. In yet other selection techniques, a user may filter fracture subsets based upon a connectivity factor 36 representing a connected distance of each fracture to a well perforation. There may also be a range of acceptable connectivity factors. For example, a connectivity factor can be calculated based on an adjacency matrix that would represent a graph of all fractures. The connectivity factor would be based on the connected 'distance' of a fracture to the well perforation. For example, a user could select as a subset all fractures that are connected to the well perforation by two degrees of separation or less. The user may use a connectivity factor value as a threshold all fractures to be filtered so that only those fractures that have a connectivity factor above the threshold will be directly modeled or upscaled.

Figure 3C:
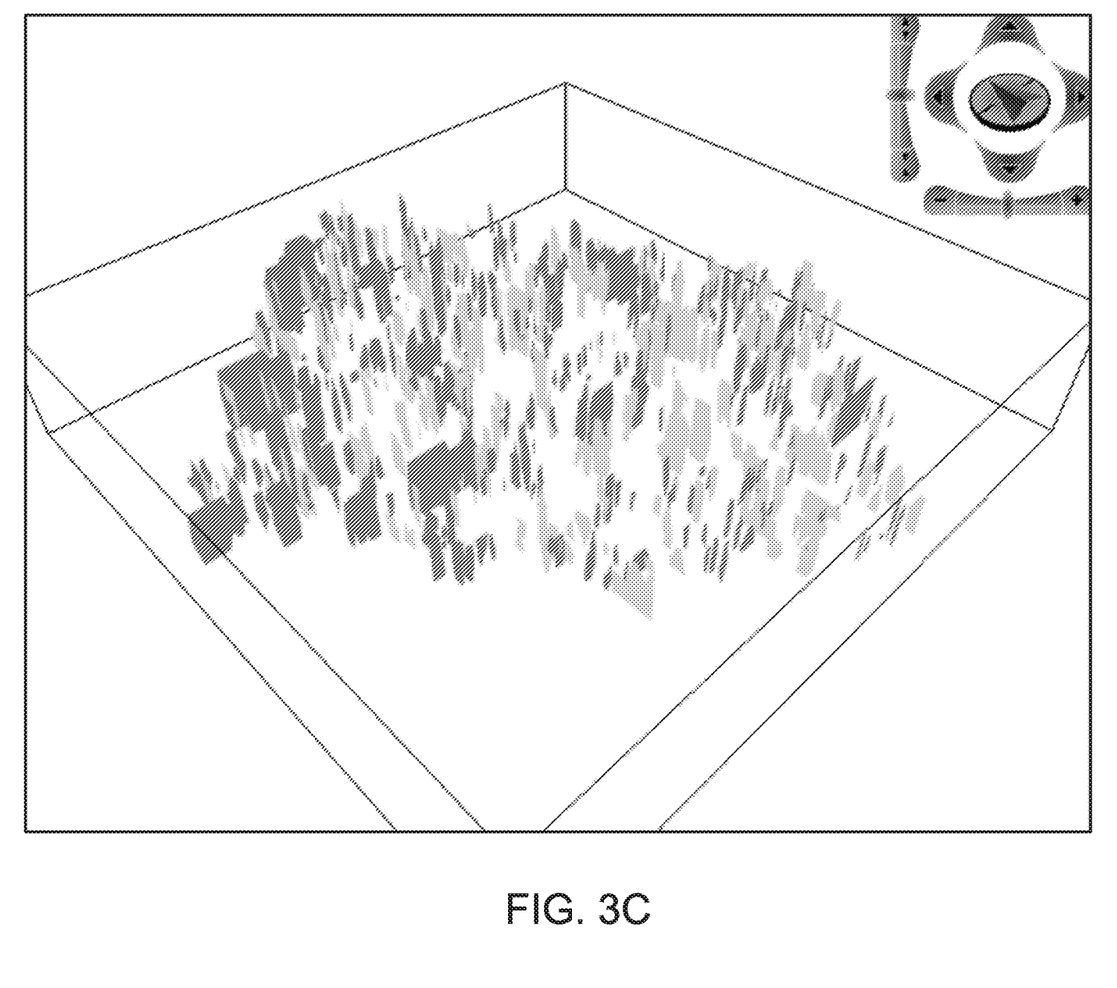
FIG. 3C is an illustrative 3D visualization of a NFN with two fracture subsets.

FIG. 3C is an illustrative 3D visualization of a NFN with two fracture subsets. Once the first and second fracture subsets have been selected at block 204, cells of the grid near/in the first fracture subset are refined at block 206. Here, hybrid engine 110 analyzes all cells in/near the first fracture subset to determine which need refinement in any direction in the 3D space. As previously mentioned, a variety of refinement techniques may be utilized—one of which being the AGAR technique. Using AGAR, cell edges are refined up to "n" time and no edge is split (and, thus, splitting the cell) if splitting will produce an edge shorter than the "targetSize." "targetSize" is the desired mesh size, or edge length, necessary to resolve the fracture width. In certain embodiments, the targetSize value is provided to the system based upon a desired level of accuracy and the desired time to solution. In order to generate the 3D geocellular grids, the methods must determine whether a cell should be refined and in what direction those cells should be refined. In certain illustrative embodiments, there are two types of rules for determining whether a cell should be refined: 1) gradation rules (rules that ensure slow transitions in element side) and 2) intersection rules (rules that ensure the fractures are adequately represented).

In a generalized example to summarize the AGAR method, consider the U directions (one direction in a 3D space). Note that U is direction in a topological sense, not in a Euclidean sense. The U "direction" for each cell is independent of the U direction for a neighbor cell. Further, within a cell, one "U" edge might point in a slightly different direction than another "U" edge. Considering the U direction, hybrid engine 110 will analyze all cells within the model and refine those near-fracture cells in the U direction if all U edges are longer than C×targetSize and at least one of the following Rules are met: 1) a scaled U edge intersects a fracture; 2) for any opposing pair of edges in the U direction, exactly one of the two scaled edges intersect a fracture; 3) a U edge has two or more "hanging" nodes; 4) for any opposing pair of edges in the U direction, exactly one of the two edges has two or more hanging nodes; or 5) the unscaled cell intersect a fracture but no scaled edge of the cell intersects a fracture. Referring to C×targetSize, for an implementation-specific or user-supplied scalar variable, C, hybrid simulation system 100 will not split any edges (thus, cells) that are shorter than C×targetSize. In this illustrative method, C is selected as $\sqrt{2}$, but could be other variables such as, for example, 4/3 or any finite value. This process is repeated for each direction in the 3D space.

A "hanging node" is a node, generally created during the refinement of a neighboring cell, which is not required to maintain the underlying geometry of the cell of interest. For example, the underlying geometry of may be a hexahedron. Consider a cell H, when a neighboring cell is refined, an extra node is added the hexahedron-shaped cell H. This node is "hanging" with respect to cell H. In yet other illustrative embodiments, the edge length requirement may be omitted for Rules 3 and 4 if strict adherence to the one hanging node guideline is adopted.

Figure 4:
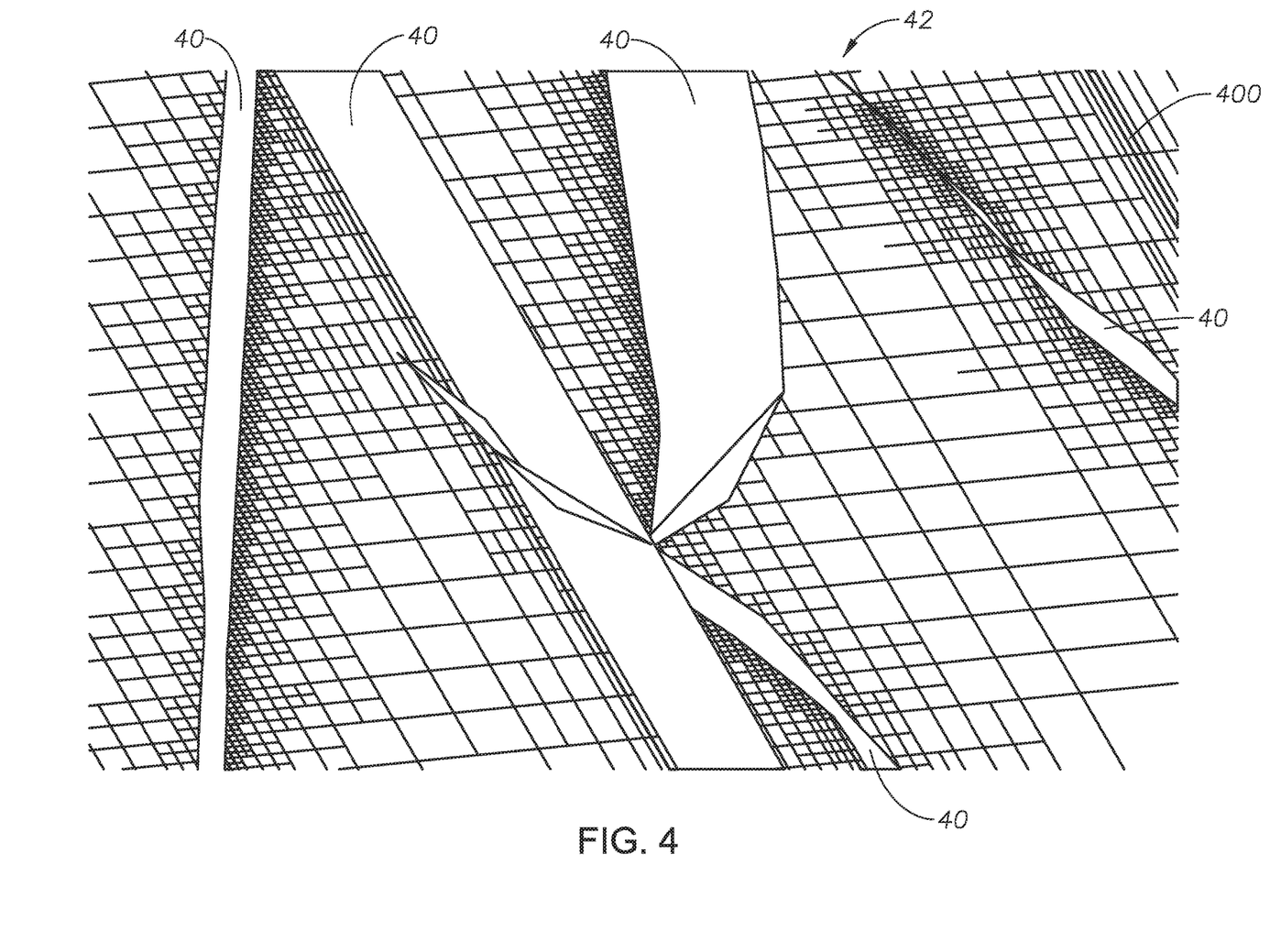
FIG. 4 illustrates a number of refined fractures embedded into a 3D geocellular grid, according to one example of the present disclosure.

Once the desired refinement directions have been determined for a cell, hybrid engine 110 performs the refinement (i.e., splitting of edges) for that cell. The cells may be refined in variety of configurations within a 3D u-v-w space. Hybrid engine 110 iteratively performs the methods described herein by first determining whether the near-fracture cells should be refined in the U, V, or W directions, and then, if so, splitting the edges in the necessary directions. The possible configurations of cell refinement range from refining in no refinement directions to refining in all refinement directions. Since these cells will be those cells positioned in the near-fracture region, the mesh resolution of the resulting images will be greatly improved. FIG. 4 illustrates a number of refined fractures 40 embedded into a 3D geocellular grid 42, according to one example of the present disclosure.

At block 208, hybrid simulation system 100 upscales the second fracture subset. This upscaling results in the fracture continuum properties, including the transfer properties between the matrix and fracture continua. Several techniques exist to calculate dual continuum approximations, as well as multi-continuum approximations. For example, one such continuum approximation technique is described in Oda, M., 1985, *Permeability Tensor for Discontinuous Rock Masses*, Geotechnique Vol. 35, pp 483. As a result, at block 208, the 3D geocellular grid now contains the dual continuum (e.g., dual porosity) properties.

At block 210, hybrid simulation system 100 now embeds the first fracture subset and the upscaled second fracture subset into the 3D geocellular grid, thus generating the hybrid 3D geocellular grid. Here, the properties (e.g., permeability) of the cells representing the first fracture subset are adjusted to account for the properties of those fractures (i.e., directly modeled), while the remaining cells representing the second fracture subset are approximated using the matrix and fracture continuum properties, as described above. In certain illustrative embodiments, the cells of the first fracture subset will only include fracture properties. Accordingly, the resulting output is a 3D geocellular grid that possesses a higher level of mesh resolution in those areas surrounding the first fracture subsets (i.e., near-fracture areas and the fractures), and lower mesh resolution in the areas of the second fracture subset.

Figure 5:
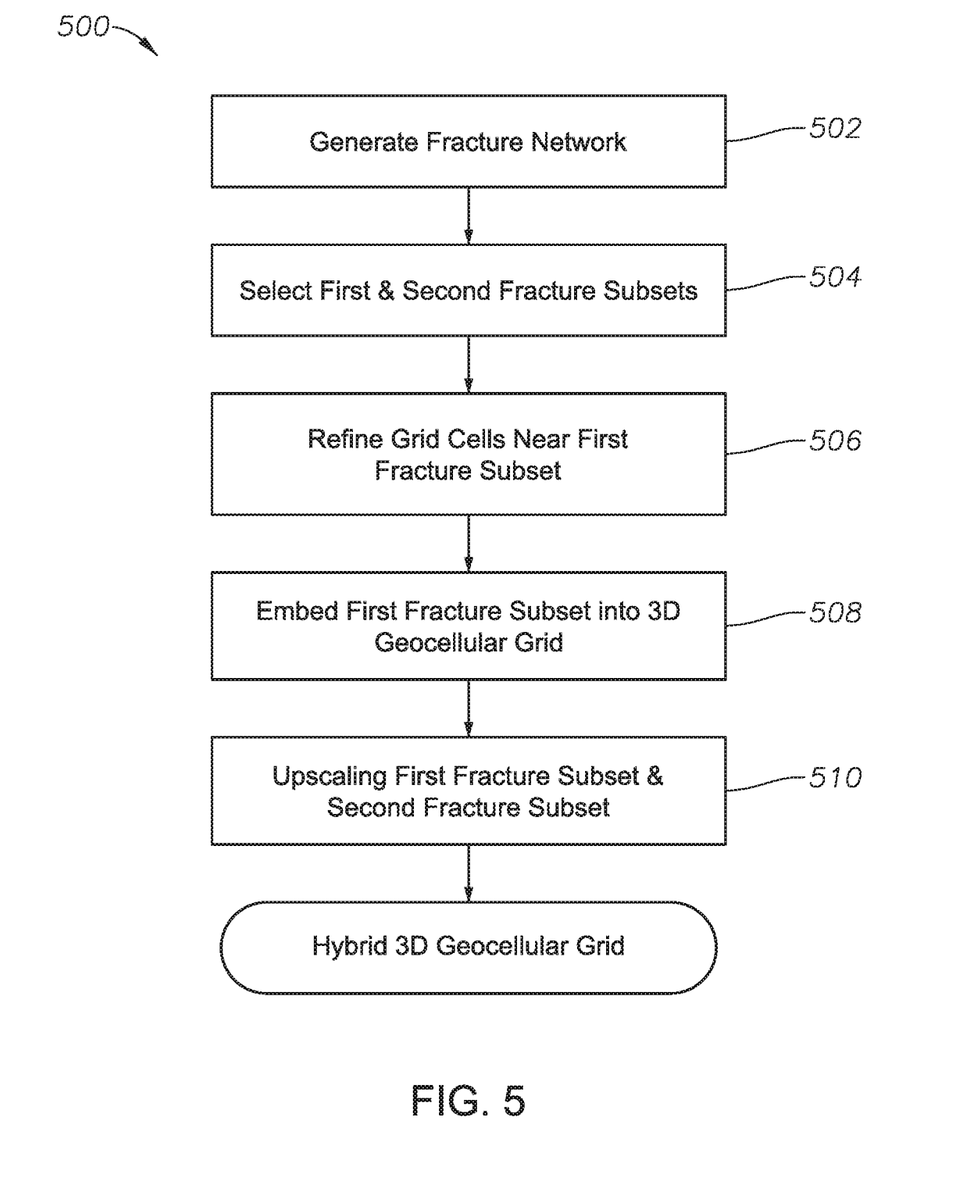
FIG. 5 is a flow chart of an alternative method for generating a hybrid 3D geocellular grid, according to certain illustrative methods of the present disclosure.

FIG. 5 is a flow chart of a method 500 for generating a hybrid 3D geocellular grid, according to certain illustrative methods of the present disclosure. At blocks 502, 504 and 506, the NFN is generated, first and second fracture subsets are selected, and the first fracture subset adjacent cells are refined, as described above in method 200. As previously described, the refinement can be achieved using, for example, the AGAR technique or a simpler technique such as Stadia Meshing. At block 508, hybrid simulation system 100 embeds the first fracture subset within the 3D geocellular grid. However, in block 508, the system does not embed any fracture continuum properties into the matrix continuum (as done in method 200); instead the system simply refines the cells as necessary. Also, the geocellular grid may have been a pre-existing grid which was refined or a reservoir description (whereby the grid was generated as a high-resolution grid). Nevertheless, the resulting output at block 508 is a geocellular grid having the desired spatial resolution near the hydraulic fractures but with properties representing only the matrix. At block 510, the fracture properties of the first fracture subset and the second fracture subset are then upscaled to determine the fracture continuum properties. Any desired approximation technique may be used here, as described above. Here, the system uses properties of the first fracture subset, second fracture subset, and the refined grid to approximate the fracture continuum properties. The resulting output is a hybrid 3D geocellular grid which may be used for a variety of reservoir simulations.

In certain alternative method of the present disclosure, the refining of block 506 may include replacing matrix properties of the cells of the first fracture subset with fracture continuum properties of the first fracture subset cells. As a result, when the upscaling of block 510 is performed, the fracture continuum properties of the first fracture subset are already embedded while the matrix continuum properties have been removed from the first fracture subset cells.

In certain other illustrative methods of the present disclosure, the hybrid 3D geocellular grids may be validated. Here, the hybrid model may be compared to a corresponding model with all natural fractures directly modeled for quality assurance purposes. This may not always be possible if the natural fractures are too numerous for the computer system on which the modeling is being done, but on large enough computer systems this comparison can be used to validate the approximation made in the hybrid model. The validation will be done, for example, by comparing the well production (including, for example, rates and pressures at bottomhole, pressures at wellhead, etc.) as well as the dynamic reservoir response. The latter can be characterized by the recurrent properties such as, for example, phase pressures, phase saturations, etc. If the validation shows that the approximate (hybrid) model is not accurate enough for the application at hand, the user can use the simulation results to manually filter out from the hybrid model those the natural fractures which have little or no impact. For example, a large number of natural fractures may have no impact on pressure depletion profiles. Thus, filtering them out for the hybrid simulation model will not have any significant impact on simulation results of the hybrid model.

Figure 6:
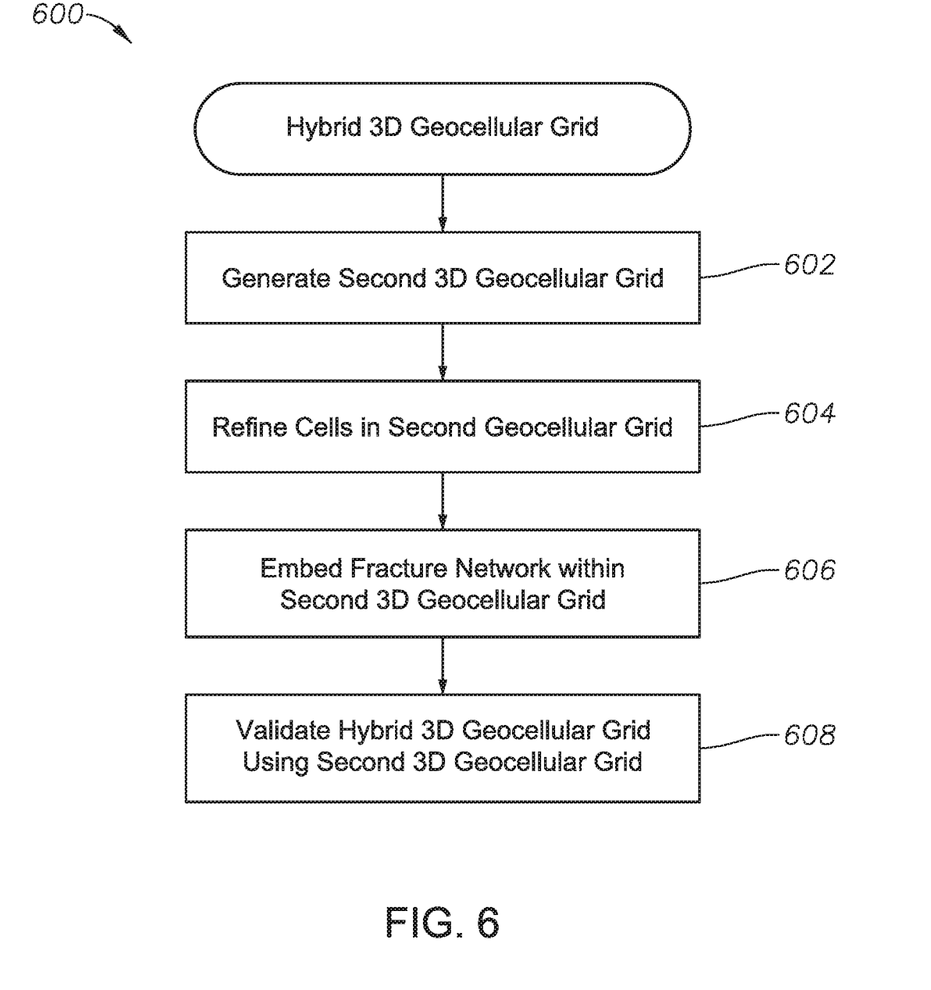
FIG. 6 is a method for validating a hybrid 3D geocellular grid, according to certain illustrative methods of the present disclosure.

In view of the foregoing, FIG. 6 is a method 600 for validating a hybrid 3D geocellular grid, according to certain illustrative methods of the present disclosure. After the hybrid 3D geocellular grid of methods 200 or 500 have been have been generated, a second 3D geocellular grid having a second fracture network therein is generated at block 602. At block 604, the cells of the grid in or near second fracture network are refined. AT block 606, the second fracture network is embedded within the second 3D geocellular grid. Then, at block 608, the hybrid 3D geocellular grid is validated by comparison to the second 3D geocellular grid. Thereafter, as discussed above, certain fractures may be removed from the hybrid model when those fractures have no significant impact on the simulation results.

In yet other illustrative methods, the simulation run times may be further shortened through the use of a single phase simulation (e.g., gas-only), the use of coarser grid cells in the simulation model, etc.

During testing of illustrative methods described herein, the hybrid technique was compared against the discrete and dual methods using the same single-phase gas base case. The discrete method involved a single continuum formulation where a fine mesh resolution is provided near all of the fractures. The dual methods involved a formulation where the entire set of natural fractures were upscaled to the fracture continuum and the hydraulic fractures were modeled as part of the matrix continuum. The dual comparison case was simulated on the grid obtained after resolving the hydraulic fractures in it. The discrete case was simulated on a single-porosity grid that resolved the hydraulic fractures and all natural fractures in it. Two types of hybrid methods were used: For the hybrid method of Type 1, major NFNs (i.e., first fracture subset), along with the hydraulic fractures, were first resolved in the matrix continuum grid, and then the minor NFNs (i.e., second fracture subset) were upscaled into the fracture continuum grid. The latter was performed through the same upscaling algorithm as for dual cases. For the hybrid method of Type 2, upscaling was conducted followed by refinement: minor natural fractures were upscaled to the fracture continuum grid, and then the grid was refined to embed the hydraulic fractures and major natural fractures.

The major natural fractures are those being directly embedded in the matrix continuum grid, whereas the minor ones are considered an approximation through upscaling and are represented in the fracture continuum grid. In this case, the major natural fractures were the five large fractures that are longer than the shorter ones that are clustered together more closely.

Figure 7:
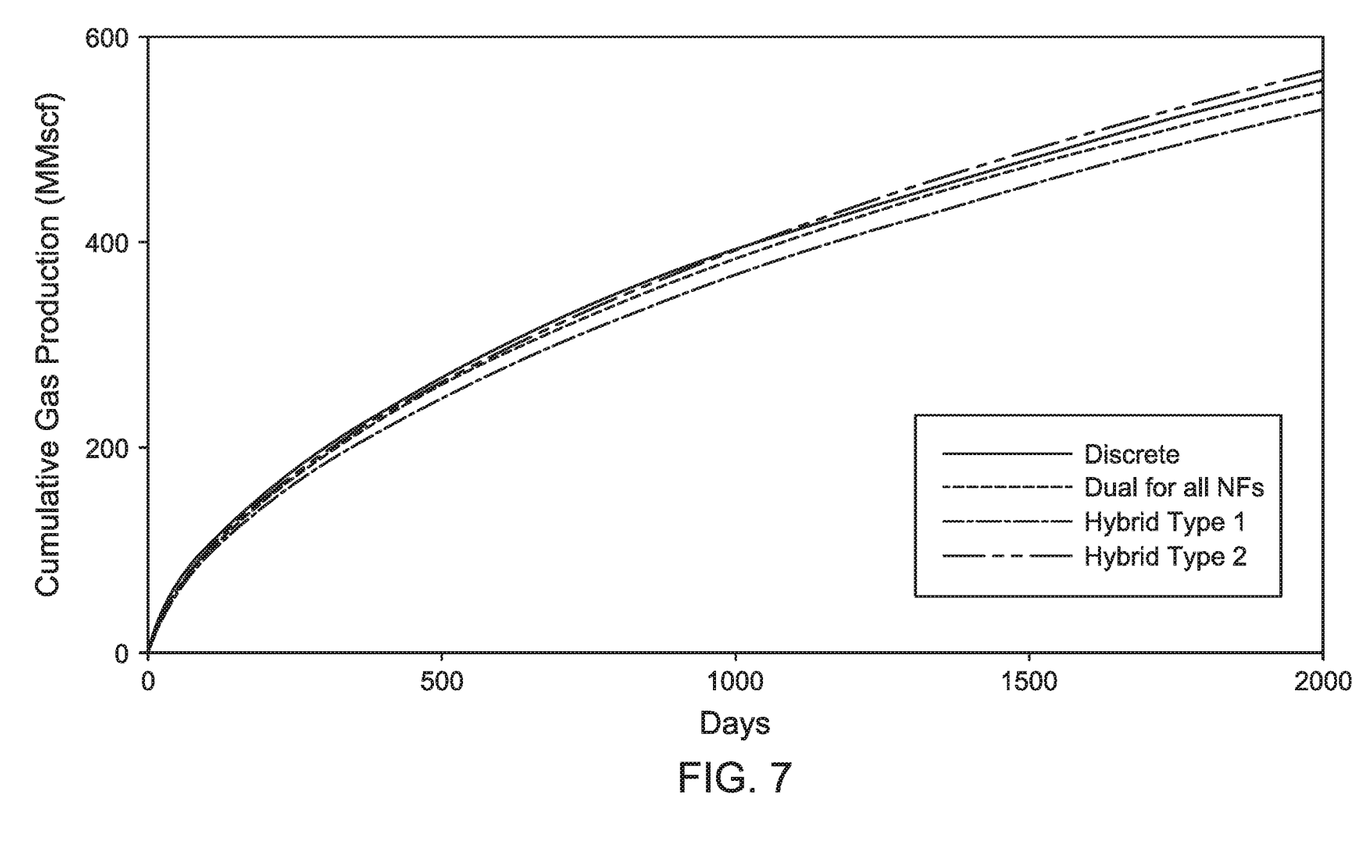
FIG. 7 illustrates a comparison of simulation results with respect to the cumulative gas production.

A comparison of the simulation results with respect to the cumulative gas production is shown in FIG. 7. Considering the discrete case as the most accurate, the dual and hybrid Type 2 methods performed well, and even the hybrid Type 2 could be adequate for scoping studies. The dual case was faster to simulate (14 sec) than the discrete (67 min in serial or 18 min on eight processes). However, the hybrid cases were closer to the dual in performance (251 sec for Hybrid Type 1 and 560 sec for Hybrid Type 2).

Figure 8:
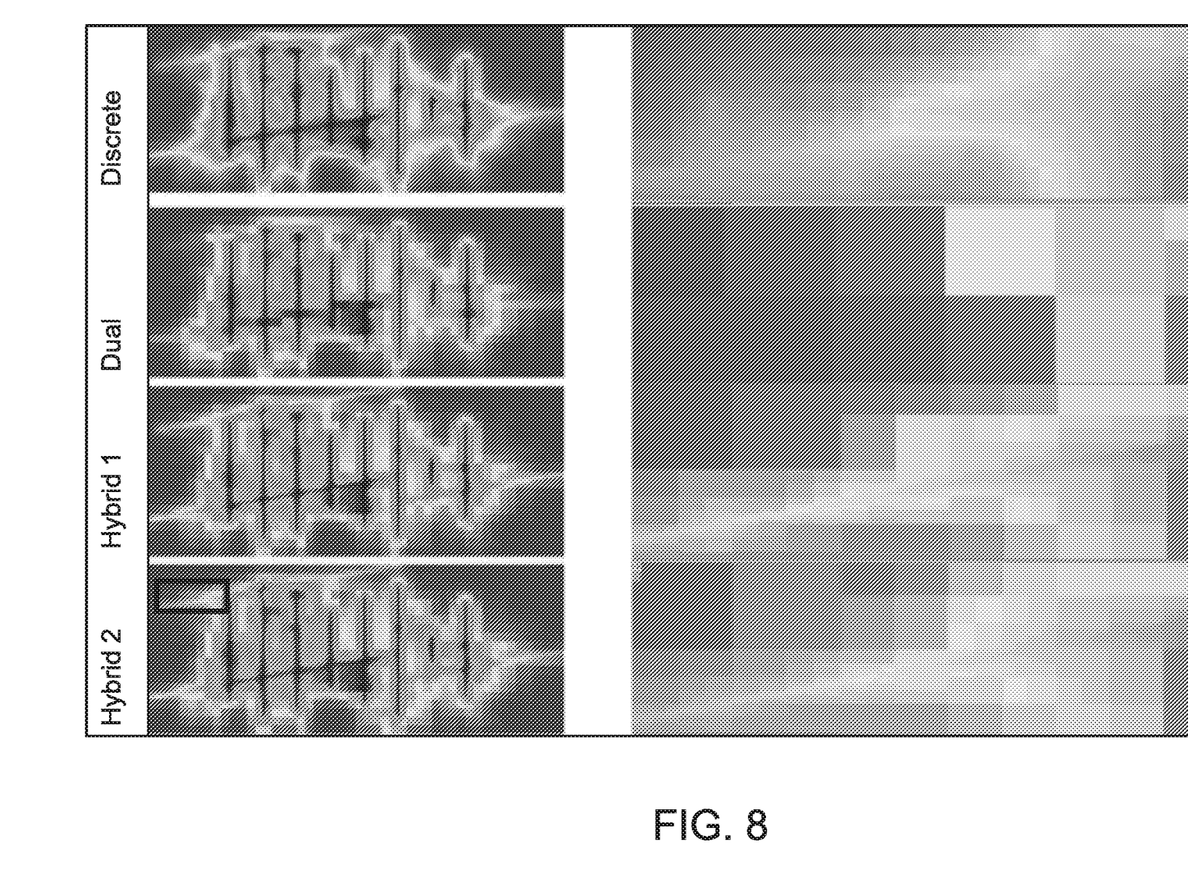
FIG. 8 shows a comparison of pressure fields in the matrix at 2,000 days, shown for the (left) entire reservoir and (right) a detailed view of the area highlighted by the box for the Hybrid Type 2 (the bottom row of the first column).

The variation in results between the two hybrid types can be attributed to its partially dual nature, so it can experience the same problem as the dual technique where the choice of upscaling method can make a significant difference in results, which is hard to predict a priori. The pressure distribution from the simulation results (FIG. 8) for these four cases show, as expected, that the discrete method has the best resolution and the dual method has the least. But the pressure fields for both the hybrids are much closer in resolution to the discrete than the dual. More specifically, FIG. 8 shows comparison of pressure fields in the matrix at 2,000 days, shown for the (left) entire reservoir and (right) a detailed view of the area highlighted by the box for the Hybrid Type 2 (the bottom row of the first column).

The illustrate embodiments and methods described herein provide a number of advantages. The disclosed methods improve the effectiveness of a reservoir simulator in development planning of oil and gas assets by improving the performance of the system while generating the simulation grid, as well as the run time of simulations for those assets where natural fractures are known to or suspected to affect well productivity. System performance is improved primarily by representing a subset of the NFN directly in the grid, while the rest of the NFN is approximated by dual continuum formulations. Moreover, the present disclosure also provides a filtering mechanism to interactively select which subset of the NFN will be gridded directly. The various methods described herein may be fully or partially automated. From a user's perspective, the process may appear to be fewer than three steps.

The generated hybrid 3D geocellular models may be utilized in a variety of applications, such as in a reservoir simulation. A primary and often unique application of reservoir simulation is in estimation of recoverable reserves in an oil and gas asset. The ability to create and simulate a hybrid simulation model makes it possible to more accurately and in a timely manner predict ultimate recovery (EUR) from naturally fractured reservoir, both conventional and unconventional, whether of typical or very large size. Thereafter, the reservoir simulation may be utilized to plan the exploitation of a naturally-fractured oil and gas asset. Various scenarios involving complex multiphase processes in subterranean formations, such as oil recovery through water flooding or gas injection, once simulated, provide the basis for optimization of naturally fractured reservoirs.

Another use of hybrid reservoir simulation models is in making possible uncertainty analysis for large, naturally-fractured reservoirs. In these iterative workflows, several (sometimes 100's or 1000's) variants of a base reservoir model are required to be simulated and so quick-running simulations are necessary. Uncertainty analysis quantifies the range of outcomes (e.g. recovery factors, net present value, cumulative production at a certain time in future) expected from the asset when provided probability distributions of the variables in the model (e.g. distribution of NFNs, matrix permeabilities, porosities, geological facies) that are not known precisely but are expected to significantly affect the outcome. Optimization of a wellbore completion design in shales, such as the Eagle Ford, where not only the effective reservoir permeability but also the hydraulic fracture propagation pattern is significantly influenced by natural fractures, benefits from the use of hybrid models of the type described in the present application. Moreover, a "look-back study" can be performed using the hybrid simulation model to determine causes of failure of completion (including hydraulic fracturing) in a problem well and to improve such downhole operations in future wells.

Embodiments and methods described herein further relate to any one or more of the following paragraphs:

1. A computer-implemented method to generate a hybrid three-dimensional ("3D") geocellular grid, the method comprising utilizing reservoir data to generate a fracture network; selecting a first fracture subset in the fracture network; selecting a second fracture subset, different from the first fracture subset, in the fracture network; refining cells of a 3D geocellular grid near the first fracture subset; upscaling the second fracture subset; and embedding the first fracture subset and the upscaled second fracture subset within the 3D geocellular grid, thereby generating a hybrid 3D geocellular grid.

2. A computer-implemented method as defined in paragraph 1, wherein refining cells comprises splitting an edge of the cells.

3. A computer-implemented method as defined in paragraphs 1 or 2, wherein upscaling the second fracture subset comprises performing a multi-continuum approximation using the second fracture subset.

4. A computer-implemented method as defined in any of paragraphs 1-3, wherein the first fracture subset is selected using a connectivity factor representing a connected distance of each fracture to a well perforation.

5. A computer-implemented method as defined in any of paragraphs 1-4, wherein the first and second fracture subsets are selected via a stereonet, visualization or fracture attribute.

6. A computer-implemented method as defined in any of paragraphs 1-5, further comprising generating a second 3D geocellular grid having a second fracture network therein; refining cells of the second 3D geocellular grid near the second fracture network; embedding the second fracture network within the second 3D geocellular grid; and validating the hybrid 3D geocellular grid by comparing the hybrid 3D geocellular grid to the second 3D geocellular grid.

7. A computer-implemented method as defined in any of paragraphs 1-6, further comprising removing fractures from the hybrid 3D geocellular grid based upon the validation.

8. A computer-implemented method as defined in any of paragraphs 1-7, further comprising performing a reservoir simulation using the 3D geocellular grid.

9. A computer-implemented method as defined in any of paragraphs 1-8, wherein the reservoir simulation is used to plan, perform, or analyze a wellbore operation.

10. A computer-implemented method as defined in any of paragraphs 1-9, wherein the reservoir simulation is used to predict productivity of a well.

11. A computer-implemented method to generate a hybrid three-dimensional ("3D") geocellular grid, the method comprising utilizing reservoir data to generate a fracture network having a plurality of cells therein; selecting a first fracture subset in the fracture network; selecting a second fracture subset, different from the first fracture subset, in the fracture network; generating a 3D geocellular grid having high resolution near the first fracture subset; embedding the first fracture subset within the 3D geocellular grid; and upscaling the first fracture subset and the second fracture subset, thereby generating a hybrid 3D geocellular grid.

12. A computer-implemented method as defined in paragraph 11, wherein generating the 3D geocellular grid comprises splitting an edge of cells near the first fracture subset; or directly generating a high resolution 3D geocellular grid using a reservoir description.

13. A computer-implemented method as defined in paragraphs 11 or 12, wherein generating the 3D geocellular grid further comprises replacing matrix properties of the cells with fracture properties of the first fracture subset.

14. A computer-implemented method as defined in any of paragraphs 11-13, wherein the upscaling comprises performing a multi-continuum approximation using the first fracture subset, second fracture subset, and the high resolution grid near the first fracture subset.

15. A computer-implemented method as defined in any of paragraphs 11-14, wherein the first fracture subset is selected using a connectivity factor representing a connected distance of each fracture to a well perforation.

16. A computer-implemented method as defined in any of paragraphs 11-15, wherein the first and second fracture subsets are selected via a stereonet, visualization or fracture attribute.

17. A computer-implemented method as defined in any of paragraphs 11-16, further comprising generating a second 3D geocellular grid having a second fracture network therein; refining cells in the second fracture network; embedding the refined second fracture network within the second 3D geocellular grid; and validating the hybrid 3D geocellular grid by comparing the hybrid 3D geocellular grid to the second 3D geocellular grid.

18. A computer-implemented method as defined in any of paragraphs 11-17, further comprising removing fractures from the hybrid 3D geocellular grid based upon the validation.

19. A computer-implemented method as defined in any of paragraphs 11-18, wherein the 3D geocellular grid used in embedding the first fracture subset was provided as a pre-existing 3D geocellular grid; or was generated using a reservoir description.

20. A computer-implemented method as defined in any of paragraphs 11-19, further comprising performing a reservoir simulation using the 3D geocellular grid.

21. A computer-implemented method as defined in any of paragraphs 11-20, wherein the reservoir simulation is used to plan, perform, or analyze a wellbore operation.

22. A computer-implemented method as defined in any of paragraphs 11-22, wherein the reservoir simulation is used to predict productivity of a well.

Furthermore, any of the illustrative methods described herein may be implemented by a system comprising processing circuitry or a non-transitory computer readable medium comprising instructions which, when executed by at least one processor, causes the processor to perform any of the methods described herein.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method to generate a hybrid three-dimensional ("3D") geocellular grid, the method comprising:
    utilizing reservoir data to generate a fracture network;
    selecting a first fracture subset in the fracture network;
    selecting a second fracture subset, different from the first fracture subset, in the fracture network;
    refining cells of a 3D geocellular grid near the first fracture subset, the cells having a first resolution, wherein the refining comprises:
        selecting cells of the 3D geocellular grid to refine based upon a gradation rule; and
        refining the selected cells by splitting an edge of the cells to create split cells near the first fracture subset having a second resolution higher than the first resolution, wherein the edge of the cells is shorter than a targetSize, the targetSize being determined based upon a desired level of accuracy and a desired time to solution;
    upscaling the second fracture subset; and
    embedding the first fracture subset and the upscaled second fracture subset within the 3D geocellular grid, thereby generating a hybrid 3D geocellular grid having the second resolution near the first fracture subset and the first resolution near the second fracture subset.

2. A computer-implemented method as defined in claim 1, wherein refining the cells further comprises determining a direction in which to refine the cells based upon at least one of the gradation rule or an intersection rule.

3. A computer-implemented method as defined in claim 1, wherein:
    the first fracture subset is selected using a connectivity factor representing a connected distance of each fracture to a well perforation.

4. A computer-implemented method as defined in claim 1, further comprising:
    generating a second 3D geocellular grid having a second fracture network therein;
    refining cells of the second 3D geocellular grid near the second fracture network;
    embedding the second fracture network within the second 3D geocellular grid; and
    validating the hybrid 3D geocellular grid by comparing the hybrid 3D geocellular grid to the second 3D geocellular grid.

5. A computer-implemented method as defined in claim 4, further comprising removing fractures from the hybrid 3D geocellular grid based upon the validation.

6. A computer-implemented method as defined in claim 1, further comprising performing a reservoir simulation using the 3D geocellular grid.

7. A computer-implemented method as defined in claim 6, wherein:
    the reservoir simulation is used to plan, perform, or analyze a wellbore operation; or
    the reservoir simulation is used to predict productivity of a well.

8. A non-transitory computer readable medium comprising instructions which, when executed by at least one processor, causes the processor to perform a plurality of operations comprising:
    utilizing reservoir data to generate a fracture network;
    selecting a first fracture subset in the fracture network;
    selecting a second fracture subset, different from the first fracture subset, in the fracture network;
    refining cells of a 3D geocellular grid near the first fracture subset, the cells having a first resolution, wherein the refining comprises:
        selecting cells of the 3D geocellular grid to refine based upon a gradation rule; and
        refining the selected cells by splitting an edge of the cells to create split cells near the first fracture subset having a second resolution higher than the first resolution, wherein the edge of the cells is shorter than a targetSize, the targetSize being determined based upon a desired level of accuracy and a desired time to solution;
    upscaling the second fracture subset; and
    embedding the first fracture subset and the upscaled second fracture subset within the 3D geocellular grid, thereby generating a hybrid 3D geocellular grid having the second resolution near the first fracture subset and the first resolution near the second fracture subset.

9. A computer-implemented method to generate a hybrid three-dimensional ("3D") geocellular grid, the method comprising:
    utilizing reservoir data to generate a fracture network having a plurality of cells therein;
    selecting a first fracture subset in the fracture network;
    selecting a second fracture subset, different from the first fracture subset, in the fracture network;
    generating a 3D geocellular grid having a first resolution;
    refining the 3D geocellular grid such that the grid has a second resolution higher than the first resolution near the first fracture subset, wherein the refinement is based upon a gradation rule and achieved by splitting an edge of the cells to create split cells near the first fracture subset having the second resolution, wherein the edge of the cells is shorter than a targetSize, the targetSize being determined based upon a desired level of accuracy and a desired time to solution;

embedding the first fracture subset within the 3D geocellular grid; and upscaling the first fracture subset and the second fracture subset, thereby generating a hybrid 3D geocellular grid having the second resolution near the first fracture subset and the first resolution near the second fracture subset.

10. A computer-implemented method as defined in claim 9, wherein refining the 3D geocellular grid comprises:

splitting the edge of cells near the first fracture subset; or directly generating a high resolution 3D geocellular grid using a reservoir description.

11. A computer-implemented method as defined in claim 10, wherein generating the 3D geocellular grid further comprises replacing matrix properties of the cells with fracture properties of the first fracture subset.

12. A computer-implemented method as defined in claim 9, wherein the upscaling comprises performing a multi-continuum approximation using the first fracture subset, second fracture subset, and the high resolution grid near the first fracture subset.

13. A computer-implemented method as defined in claim 9, wherein:

the first fracture subset is selected using a connectivity factor representing a connected distance of each fracture to a well perforation; or the first and second fracture subsets are selected via a stereonet, visualization or fracture attribute.

14. A computer-implemented method as defined in claim 9, further comprising:

generating a second 3D geocellular grid having a second fracture network therein;

refining cells in the second fracture network;

embedding the refined second fracture network within the second 3D geocellular grid; and validating the hybrid 3D geocellular grid by comparing the hybrid 3D geocellular grid to the second 3D geocellular grid.

15. A computer-implemented method as defined in claim 14, further comprising removing fractures from the hybrid 3D geocellular grid based upon the validation.

16. A computer-implemented method as defined in claim 9, wherein:

the 3D geocellular grid used in embedding the first fracture subset was provided as a pre-existing 3D geocellular grid, or was generated using a reservoir description; or the method further comprises performing a reservoir simulation using the 3D geocellular grid.

17. A computer-implemented method as defined in claim 16, wherein:

the reservoir simulation is used to plan, perform, or analyze a wellbore operation; or the reservoir simulation is used to predict productivity of a well.

* * * * *